(12) United States Patent
Sherlock et al.

(10) Patent No.: US 11,397,677 B2
(45) Date of Patent: Jul. 26, 2022

(54) SYSTEM AND METHOD FOR TRACKING PERSISTENT FLUSHES

(71) Applicant: Hewlett Packard Enterprise Development LP, Houston, TX (US)

(72) Inventors: Derek A. Sherlock, Ft. Collins, CO (US); Gregg B. Lesartre, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 16/863,977

(22) Filed: Apr. 30, 2020

(65) Prior Publication Data

US 2021/0342266 A1 Nov. 4, 2021

(51) Int. Cl.
*G06F 12/0804* (2016.01)

(52) U.S. Cl.
CPC .. *G06F 12/0804* (2013.01); *G06F 2212/1032* (2013.01)

(58) Field of Classification Search
CPC .............. G06F 12/0804; G06F 2212/1032
See application file for complete search history.

(56) References Cited

U.S. PATENT DOCUMENTS

| | | | | |
|---|---|---|---|---|
| 6,725,342 B1* | 4/2004 | Coulson | ............. | G06F 12/0804 711/135 |
| 7,653,736 B2 | 1/2010 | Van et al. | | |
| 8,516,020 B2 | 8/2013 | Aronovich et al. | | |
| 9,195,614 B2* | 11/2015 | Abali | .................. | G06F 11/1446 |
| 9,229,864 B1* | 1/2016 | Kanteti | .............. | G06F 12/0804 |
| 9,535,840 B2 | 1/2017 | Chambliss et al. | | |
| 2005/0177672 A1* | 8/2005 | Rao | ..................... | G06F 12/0866 711/3 |
| 2005/0177687 A1* | 8/2005 | Rao | ..................... | G06F 12/0897 711/118 |
| 2005/0182906 A1* | 8/2005 | Chatterjee | ............. | G06F 11/201 711/144 |
| 2006/0179250 A1* | 8/2006 | Guthrie | ............... | G06F 12/0811 711/143 |
| 2010/0049718 A1 | 2/2010 | Aronovich et al. | | |

(Continued)

FOREIGN PATENT DOCUMENTS

CN 102473156 A 5/2012

*Primary Examiner* — Prasith Thammavong
(74) *Attorney, Agent, or Firm* — Park, Vaughan, Fleming & Dowler LLP (57) ABSTRACT

One embodiment can provide an apparatus. The apparatus can include a persistent flush (PF) cache and a PF-tracking logic coupled to the PF cache. The PF-tracking logic is to: in response to receiving, from a media controller, an acknowledgment to a write request, determine whether the PF cache includes an entry corresponding to the media controller; in response to the PF cache not including the entry corresponding to the media controller, allocate an entry in the PF cache for the media controller; in response to receiving a persistence checkpoint, identify a media controller from a plurality of media controllers based on entries stored in the PF cache; issue a persistent flush request to the identified media controller to persist write requests received by the identified media controller; and remove an entry corresponding to the identified media controller from the PF cache subsequent to issuing the persistent flush request.

16 Claims, 6 Drawing Sheets

(56) References Cited

U.S. PATENT DOCUMENTS

| | | | |
|---|---|---|---|
| 2011/0296100 A1* | 12/2011 | Plank | G06F 11/1662 |
| | | | 711/113 |
| 2014/0365734 A1* | 12/2014 | Bridge, Jr. | G06F 12/084 |
| | | | 711/144 |
| 2016/0147671 A1* | 5/2016 | Vishne | G06F 12/12 |
| | | | 711/135 |
| 2016/0162412 A1* | 6/2016 | Lesartre | G06F 12/0891 |
| | | | 711/135 |
| 2016/0246723 A1* | 8/2016 | Doshi | G06F 9/30192 |
| 2017/0192886 A1* | 7/2017 | Boehm | G06F 12/0815 |
| 2017/0220478 A1* | 8/2017 | Saidi | G06F 12/1009 |
| 2019/0171568 A1 | 6/2019 | Chen et al. | |
| 2019/0339865 A1* | 11/2019 | Bains | G06F 3/0673 |
| 2019/0340089 A1 | 11/2019 | Doshi et al. | |
| 2019/0377500 A1* | 12/2019 | Murphy | G06F 3/0634 |
| 2020/0034440 A1* | 1/2020 | Schneider | G06F 16/2255 |
| 2021/0182187 A1* | 6/2021 | Raghava | G06F 1/30 |

\* cited by examiner

SYSTEM AND METHOD FOR TRACKING PERSISTENT FLUSHES

BACKGROUND

Field

This disclosure is generally related to computer memory systems. More specifically, this disclosure is related to a system and method for tracking persistent flush operations in a memory system comprising non-persistent and persistent memory devices.

Related Art

In a computer system where persistent (or non-volatile) memory is distributed or disaggregated across many media controllers, write operations that modify media content may initially modify non-persistent (or volatile) caches or write buffers in order to avoid exposing the writing node to the typically higher latency associated with the underlying persistent media. A mechanism is needed to allow the writing node to perform a "persistence checkpoint", i.e., to establish the fact that all prior writes have achieved persistence. In a large, distributed system comprising a large number of media controllers, issuing persistent flushes to all media controllers can waste resources. On the other hand, keeping track of all writes to determine whether they have achieved persistence (i.e., tracking if an acknowledged write has achieved persistence) can be difficult.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

The embodiments described herein solve the technical problem of efficiently tracking and issuing persistent flushes (PFs) to media controllers. More specifically, a writing node can implement a PF cache to track which media controllers are "owed" PFs. Entries in the PF cache identify destinations (e.g., media controllers) which are owed PFs. More specifically, an entry corresponding to a media controller can be allocated in the PF cache at the writing node issuing a write request when the write request is acknowledged by the media controller. On the other hand, an entry can be freed from the PF cache subsequent to the issuance of a PF to the corresponding media controller. To facilitate operations of the PF cache, the system also tracks the write requests issued by the write node using a tracking structure (which can be referred to as an outstanding-request tracker). A write request may be in an "outstanding" or "blocked" state. A write request can be marked as "outstanding if a response (e.g., an acknowledgement) to the write request has not yet been received. On the other hand, if the write request is acknowledged by the media controller but a corresponding entry cannot be entered into the PF cache due to the PF cache being full, the write request is marked as being in a "blocked" state in the outstanding-request tracker. A write request in the "blocked" state can prevent the corresponding sender of the write request from issuing new requests. Moreover, the outstanding-request tracker is configured to reserve at least one entry for a PF, ensuring that the PF cache eviction cannot be blocked by an outstanding-request tracker full of blocked entries. The blocked entries in the outstanding-request tracker can be cleared when the corresponding entry is allocated in the PF cache. Existing entries in the PC cache can be evicted through the autonomous issuance of PF requests to media controllers. Once a PF request is issued to a media controller, the corresponding entry for the media controller is evicted from the PF cache to allow an entry, if any, in the "blocked" state in the outstanding-request tracker to be added to the PF cache. When the writing node receives a persistence checkpoint (PC) from the application interface, the writing node walks through entries in the PF cache and, for each entry, issues a PF request to the corresponding media controller.

One embodiment can provide an apparatus. The apparatus can include a persistent flush (PF) cache and a PF-tracking logic coupled to the PF cache. The PF-tracking logic is to: in response to receiving, from a media controller, an acknowledgment to a write request, determine whether the PF cache includes an entry corresponding to the media controller; in response to the PF cache not including the entry corresponding to the media controller, allocate an entry in the PF cache for the media controller; in response to receiving a persistence checkpoint (PC), identify a media controller from a plurality of media controllers based on entries stored in the PF cache; issue a persistent flush request to the identified media controller to persist write requests received by the identified media controller; and remove an entry corresponding to the identified media controller from the PF cache subsequent to issuing the persistent flush request.

In a variation on this embodiment, the apparatus can further include an outstanding-request tracker and an outstanding-request-tracking logic. The outstanding-request-tracking logic is to remove an entry corresponding to the acknowledged write request from the outstanding-request tracker, in response to the PF-tracking logic finding a matching entry or allocating the entry in the PF cache for the media controller sending the acknowledgment.

In a further variation, the outstanding-request-tracking logic is to: keep the entry corresponding to the acknowledged write request in the outstanding-request tracker, in response to the PF cache being full; and modify a state of the acknowledged write request as being blocked.

In a further variation, the PF-tracking logic is to: in response to determining that the outstanding-request tracker comprises a blocked write request, wait for the blocked write request to be cleared from the outstanding-request tracker before issuing new write requests.

In a further variation, the outstanding-request tracker can include at least one entry reserved for persistent flush requests.

In a variation on this embodiment, the apparatus can further include a persistence-checkpoint (PC)-processing logic, a first-in, first-out (FIFO) buffer, and one or more counters. The PC-request-processing logic is to place received persistence checkpoints (PCs) in the FIFO and associate each entry in the FIFO with a counter.

In a further variation, the PC-processing logic is to: increment the counter associated with an entry in the FIFO, in response to issuing a persistent flush request triggered by the entry in the FIFO; and decrement the counter associated with the entry in the FIFO, in response to receiving a response to a persistent flush request triggered by the entry in the FIFO.

In a further variation, the PC-processing logic is to: in response to determining that a counter associated with a head entry of the FIFO reaches zero, remove the head entry from the FIFO; and send a response to a persistence checkpoint corresponding to the head entry of the FIFO.

In a variation on this embodiment, the PF-tracking logic is to issue an autonomous persistent flush request to a media controller corresponding to an entry in the PF cache, without receiving a persistence checkpoint.

In a further variation, the PF-tracking logic is to: determine whether an occupancy rate of the PF cache exceeds a predetermined threshold; in response to determining that the occupancy rate of the PF cache does not exceed the predetermined threshold, pause for a predetermined duration before determining whether to issue a subsequent autonomous persistent flush request; and in response to determining that the occupancy rate of the PF cache exceeds the predetermined threshold, issue a subsequent autonomous persistent flush request without pausing.

System for Tracking "Owed" Persistent Flushes

Figure 1:
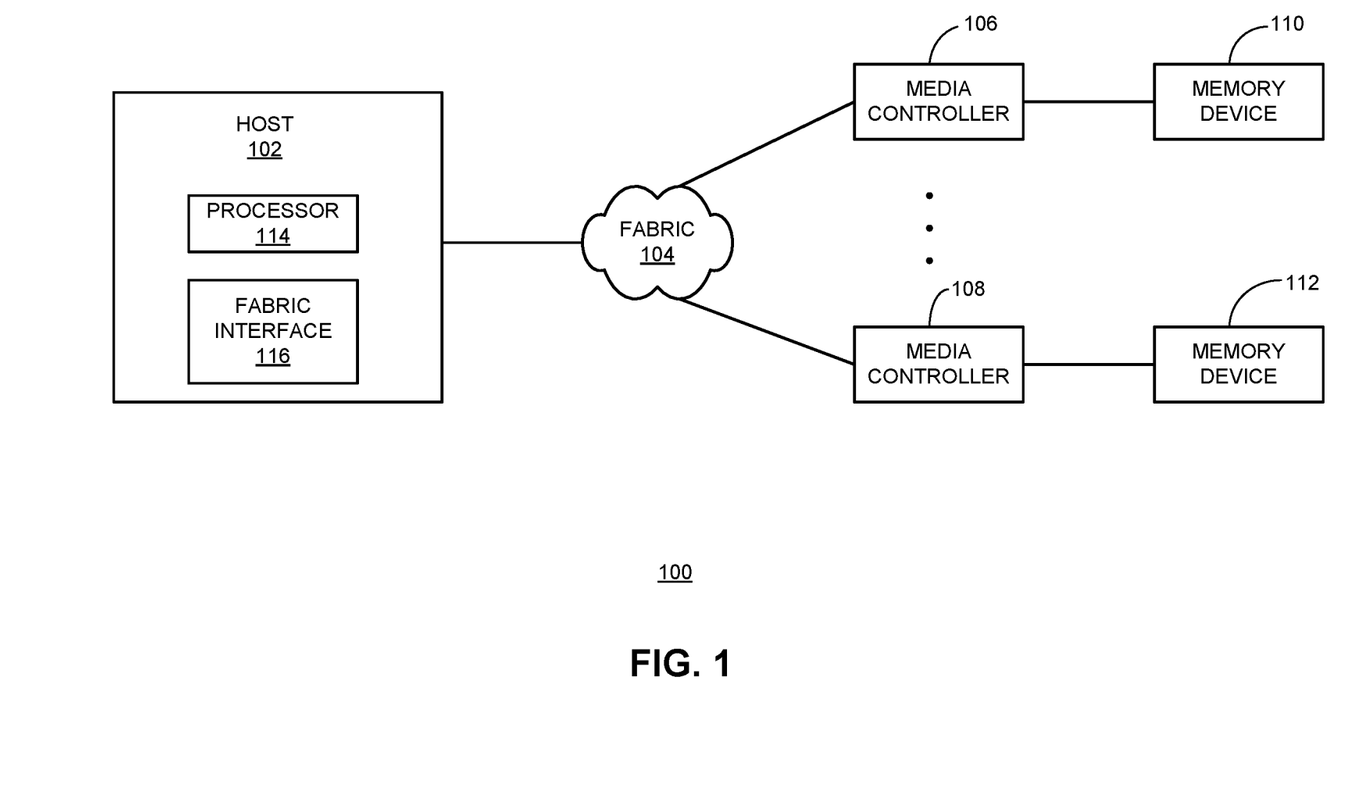
FIG. 1 illustrates an exemplary computing system implementing a distributed memory system, according to one embodiment.

FIG. 1 illustrates an exemplary computing system implementing a distributed memory system, according to one embodiment. Computing system 100 can include a host 102, a fabric 104, a number of media controllers (e.g., media controllers 106 and 108), and a number of memory devices (e.g., memory devices 110 and 112).

Host 102 can be a write node for issuing write requests to the media controllers via fabric 104. Host 102 can include a processor 114 and a fabric interface 116. Processor 114 can include a microprocessor, a core of a multi-core microprocessor, a microcontroller, a programmable integrated circuit, a programmable gate array, a system on a chip (SoC), or another hardware processing circuit. Fabric interface 116 can be a separate device or integrated with processor 114.

Fabric interface 116 on host 102 can sometimes be referred to as a requester, which can be any device that is able to access data of a media controller. In some embodiments, there can be a one-to-one correspondence between a host and a fabric interface, as shown in FIG. 1. Alternatively, a host can be coupled to fabric 104 via multiple fabric interfaces, or multiple hosts can be coupled to fabric 104 via a single shared fabric interface. Fabric 104 can include a network, a link, a bus, or any other type of interconnect to allow for communication between host 102 and the media controllers. Fabric 104 can be a memory fabric or a Gen-Z fabric. In the example shown in FIG. 1, the system includes only one host with one requester (i.e., fabric interface 116). In practice, a system may include multiple requesters accessing data stored in the media devices. In some embodiments, computing system 100 and the various components within computing system 100 can implement Gen-Z technologies, which provide memory-semantic data access and enable all component types to directly communicate with one another.

A media controller (e.g., media controller 106 or 108) refers to a controller that is able to issue access commands to a memory device that meets a timing and protocol specification of the memory device. A memory device (e.g., memory device 110 or 112) can include an individual memory integrated circuit (IC) chip or multiple memory IC chips. Different types of memory devices can have different timing and protocol specifications. As discussed previously, a write request issued by the requester may first cause the corresponding content in the non-persistent cache to be modified, before such modification is flushed into the persistent memory.

A host or requester can establish one or more persistence checkpoints, with a checkpoint ensuring that all write requests issued prior to the checkpoint have achieved persistence to facilitate subsequent data recovery up to the checkpoint. To do so, the requester can issue persistent flush (PF) requests across the fabric explicitly instructing the media controllers to persist any write that has not achieved persistence. Issuing PFs to all media controllers may not be cost-effective for a system having a large number of media controllers, and it is also difficult to track all write requests to determine which have been persisted and which have not. In some embodiments, the host can maintain a PF cache that tracks media controllers that are "owed" PFs. A media controller being owed, by the host, a PF means that the media controller received and acknowledged write requests issued by the host but has not received a PF request from the host. In such an event, the write request may or may not be persisted by the media controller. When the requester receives, from an upper-level application, a persistence checkpoint, the requester only needs to issue PF requests to media controllers listed in the PF cache.

Figure 2:
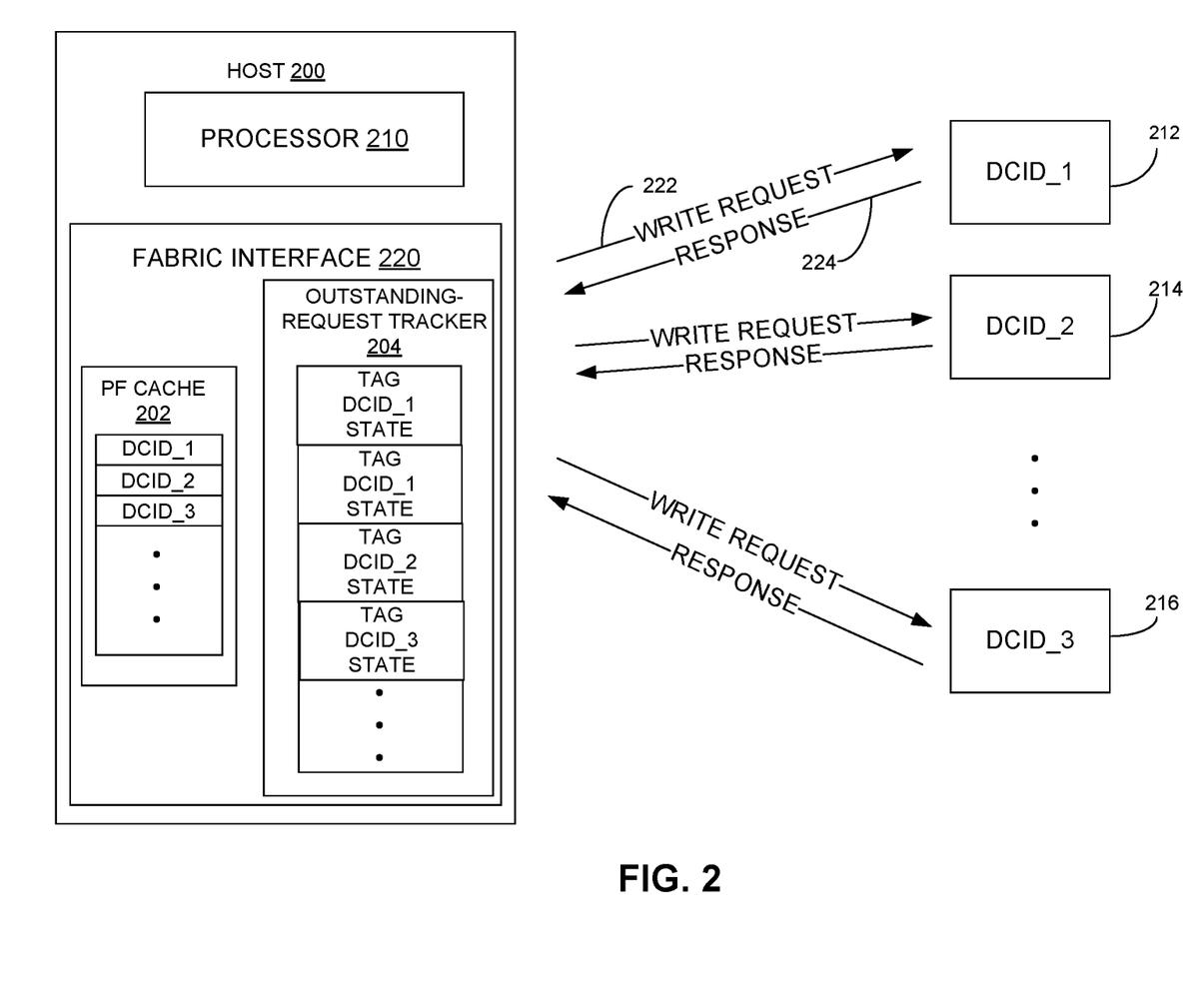
FIG. 2 illustrates exemplary interactions between a host and a number of media controllers, according to one embodiment.

FIG. 2 illustrates exemplary interactions between a host and a number of media controllers, according to one embodiment. Host 200 can include a processor 210 and a fabric interface (i.e., a requester) 220. Fabric interface 220 maintains two tracking structures, a PF cache 202 and an outstanding-request tracker 204. PF cache 202 stores a number of entries, with each entry identifying a destination (e.g., a media controller) to which fabric interface 220 "owes" a PF. In some embodiments, PF cache 202 can be implemented using a content-addressable memory (CAM). PF cache 202 can be indexed using the address or identifier of the destinations. Outstanding-request tracker 204 stores a number of entries, with each entry tracking the state of an outstanding transaction issued by fabric interface 220.

During operation, fabric interface 220 can issue write requests to media controllers (e.g., media controllers 212, 214, and 216), with each media controller being identified using a unique destination identifier (DCID). Subsequent to receiving a write request and after a possible delay, a media controller may send a response (e.g., a write ACK) back to fabric interface 220. For example, media controller 212 receives a write request 222 from fabric interface 220 and sends response 224 back to fabric interface 220.

Once a write request is issued by fabric interface 220, an entry corresponding to the write request is added to outstanding-request tracker 204. Such an entry can include a tag, which is a unique identifier assigned to each transaction (e.g., a write request), and a destination ID, which identifies the media controller. In a conventional system, a write request may have two states: "outstanding," or "acknowledged." A write request is in an outstanding state if a response (e.g., a write ACK) to the wire request has not been received by the host. In most cases, when a write request is acknowledged by the media controller, the entry corresponding to the write request is removed from the outstanding-request tracker. Note that the acknowledgment of a write request sent by a media controller simply indicates that the write request has been received and is possibly being processed by the media controller. It is not an indication of the to-be-written data achieving persistence. In an alternative embodiment, the write requests in the outstanding-request tracker may have other states, such as "unsent" and "timeout." For example, a write request may be inserted into the outstanding-request tracker before it is actually issued. Such a write request will remain in the "unsent" state until it is issued, and its state is then changed to "outstanding." The "timeout" state means that the write request needs to be reissued since a response was not received within a predetermined timeout period. Other than write requests, other types of transaction can also be tracked by the outstanding-request tracker.

As the acknowledged write request is removed from the outstanding-request tracker, fabric interface 220 may determine if PF cache 202 already has an entry for the media controller receiving the write request. For example, if media controller 212 sends an acknowledgment for a write request to fabric interface 220, fabric interface 220 will first identify the entry corresponding to the write request in outstanding-request tracker 204 based on the unique tag of the write request. Fabric interface 220 can then determine the identifier (e.g., the DCID) of media controller 212 based on the identified entry in outstanding-request tracker 204. Once the DCID of media controller 212 is determined, fabric interface 220 checks PF cache 202 to determine if an entry corresponding to that DCID has been allocated in PF cache 202. If so, fabric interface 220 can remove the identified entry from outstanding-request tracker 204. If not, fabric interface 220 can allocate an entry in PF cache 202 for that DCID and subsequently removes the entry for the write request from outstanding-request tracker 204.

For a large system where the number of media controllers is high, it may not be practical to implement a PF cache that is large enough to store entries for all media controllers. In certain situations, PF cache 202 may be full of entries and fabric interface 220 can no longer add new entries into PF cache 202. In such a situation, instead of removing the write request from outstanding-request tracker 204 subsequent to receiving an acknowledgment for the write request from a media controller that does not have an entry in PF cache 202, fabric interface 220 can leave the write request within outstanding-request tracker 204 and can modify the state of the write request as "blocked." Once spaces are available in PF cache 202, entries corresponding to the "blocked" write requests can be allocated in PF cache 202. Note that a "blocked" entry in outstanding-request tracker 204 can prevent fabric interface 220 from issuing additional writes.

In addition to PF cache 202 being full, there is also the possibility of outstanding-request tracker 204 being full. In an extreme scenario, outstanding-request tracker 204 may be full of write requests that are in a "blocked" state due to the PF cache 202 being full. This can create a deadlock for both PF cache 202 and outstanding-request tracker 204, because to release the "blocked" entries from outstanding-request tracker 204, PF cache-eviction (i.e., sending PFs and receiving PF ACKs) will be needed, and new PFs cannot be sent if outstanding-request tracker 204 is full. To prevent the occurrence of such a deadlocked situation, in some embodiments, outstanding-request tracker 204 can reserve at least one entry dedicated for PF. Note that the PF is a special type of write request and an entry corresponding to a PF is added to outstanding-request tracker 204 when the host issues a PF for a media controller.

In some embodiments, the system may preemptively issue PFs to media controllers, without the upper-level application setting up the persistence checkpoints. For example, if PF cache 202 is full or if the occupancy rate of PF cache 202 exceeds a predetermined threshold (e.g., 75%), the system can issue autonomous PF requests (i.e., PF requests not trigged by checkpoints) to existing entries in PF cache 202, even though the host has not received a PF request from the upper-level applications. These preemptively issued PFs can be part of a subsequently received checkpoint. In some embodiments, the autonomous PF requests can be issued in an aggressive way with no pause between consecutive PF requests. More specifically, autonomous flushing can be performed aggressively when both of the following conditions are met: the number of outstanding PFs in outstanding-request tracker 204 is below a predetermined threshold (e.g., 50% of the capacity), and the free space in the PF cache 202 is below a predetermined threshold (e.g., 25% of the capacity) or the PF cache 202 is full and one or more entries in outstanding-request tracker 204 are in a "blocked" state. When such conditions are not met, autonomous flushing can be performed slowly, with a predetermined interval between consecutive autonomous PFs. More specifically, after each autonomous flushing, the system can pause and re-evaluate if a subsequent autonomous flushing is needed. For example, the system can determine if the PF cache is empty. If so, no further flushing is needed. If not, additional autonomous flushing can be executed after the predetermined interval.

Issuing preemptive or autonomous PF requests between checkpoints can reduce the volume of PFs and the overall time required to complete future checkpoints. Moreover, autonomous PF operations can reduce the number of entries remaining in the PF cache, thus reducing the likelihood that new write requests will be stalled due to blocked entries in the outstanding-request tracker.

Figure 3:
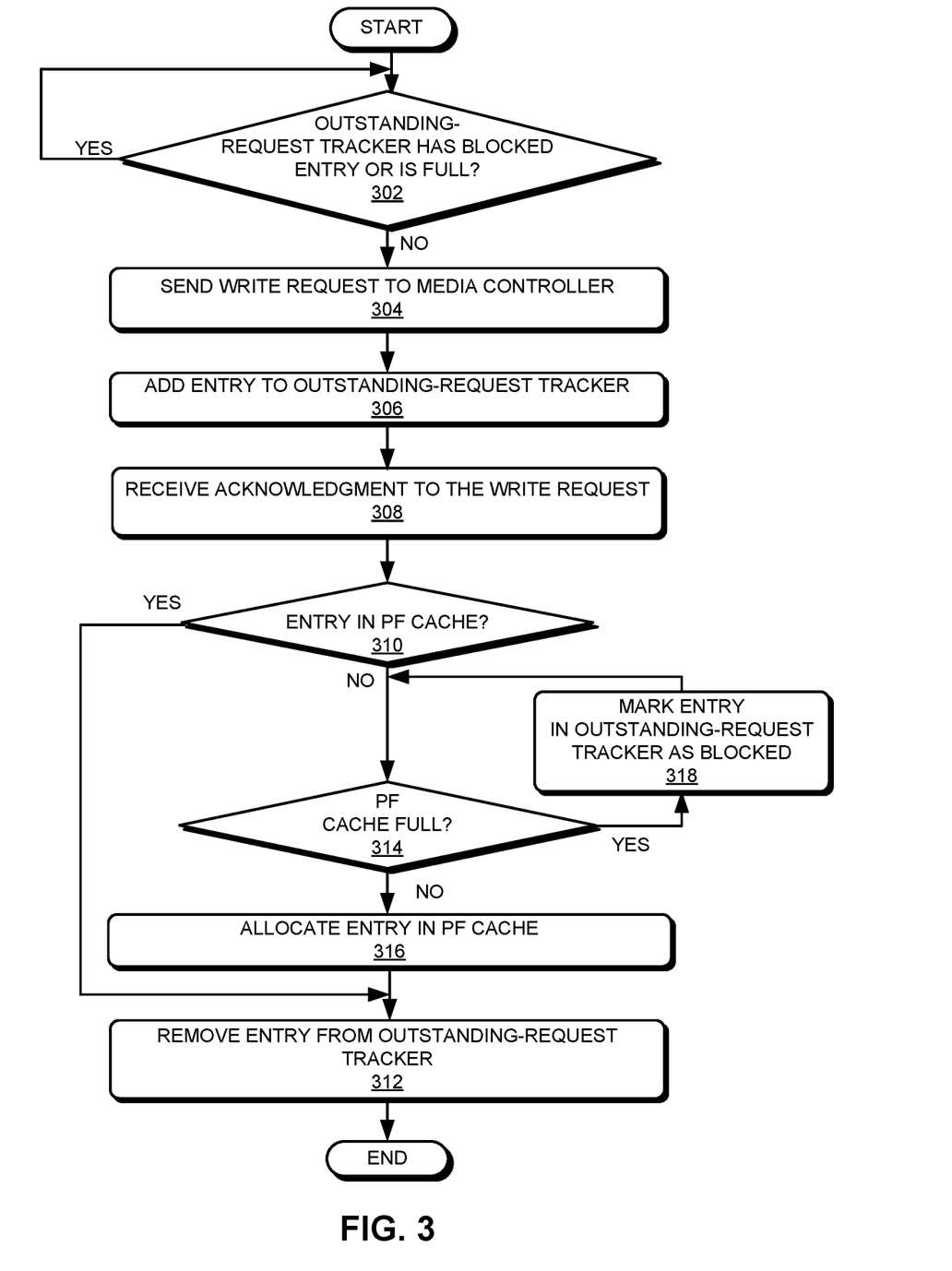
FIG. 3 presents a flowchart illustrating exemplary host operations involving the outstanding-request tracker, according to one embodiment.

FIG. 3 presents a flowchart illustrating exemplary host operations involving the outstanding-request tracker, according to one embodiment. During operation, the logic on the host checks the outstanding-request tracker to determine if it contains any blocked entry or is full (operation 302), and waits for the blocked entry to be cleared or prior entries to be evicted before sending a write request to a media controller (operation 304). The host adds an entry corresponding to the write request to the outstanding-request tracker (operation 306). The write request can cause the media controller to modify content stored on a memory device controlled or accessible by the media controller. The outstanding-request tracker entry can include a number of fields, such as the unique tag assigned to the write request, the destination ID, and the state of the write request. Prior to receiving an acknowledgment (ACK) for the write request, the state of the write request is set as "outstanding."

The host can subsequently receive, from the media controller, an acknowledgment to the write request (operation 308). Upon receiving the acknowledgment, the host can check the PF cache to determine if an entry for the media controller exists in the PF cache (operation 310). If so, the host removes the entry corresponding to the write request from the outstanding-request tracker (operation 312).

If the PF cache does not have an entry corresponding to the media controller, the host determines if the PF cache is full (operation 314). If not, the host can allocate an entry in the PF cache for the media controller (operation 316) and subsequently removes the entry corresponding to the write request from the outstanding-request tracker (operation 312). If the PF cache is full, the host can mark the state of the write request as "blocked" while leaving the entry in the outstanding-request tracker (operation 318). The host continues to monitor the PF cache for empty spaces (operation 314).

Figure 4:
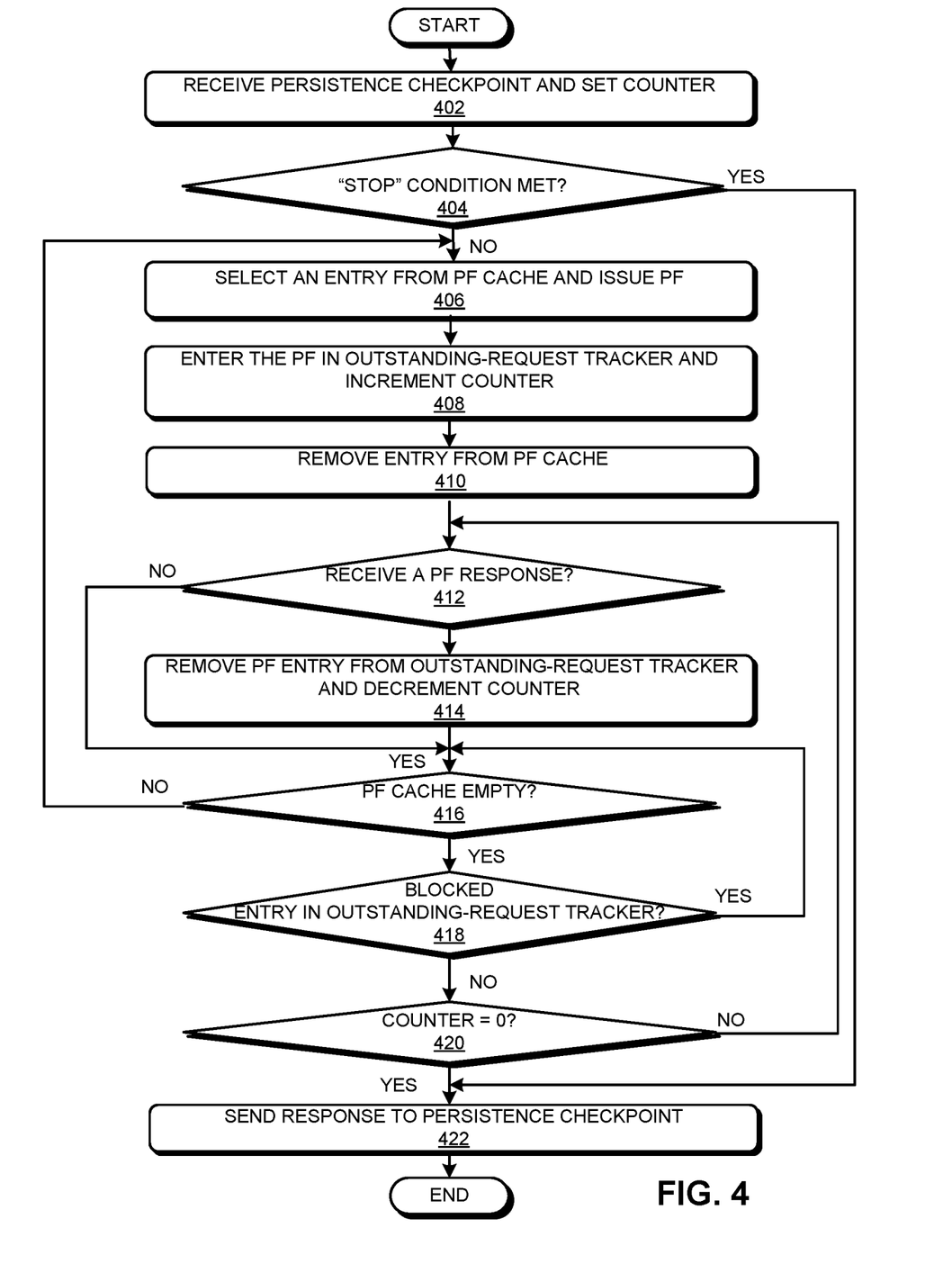
FIG. 4 presents a flowchart illustrating the exemplary operations for processing a persistence checkpoint, according to one embodiment.

FIG. 4 presents a flowchart illustrating the exemplary operations for processing a persistence checkpoint, according to one embodiment. During operation, a host can receive, from an upper-level application via an application interface, a persistence checkpoint and set the initial value of a counter to zero (operation 402). Prior to sending PF requests to media controllers, the host can determine if a "stop" condition is met (operation 404). More specifically, the "stop" condition is met when the PF cache is empty and the outstanding-request tracker contains no "blocked" entry. When the "stop" condition is met, the host stops to issue new PF requests to media controllers and sends response to the persistence checkpoint to the application (operation 422). On the other hand, existing persistence checkpoints can continue to be processed, thus freeing up spaces in the PF cache, which in turn allows the "blocked" entries from the outstanding-request tracker to be evicted (meaning that corresponding media controllers are allocated entries in the PF cache). If the "stop" condition is not met, the host can select an entry from entries in the PF cache and issue a PF request to the media controller identified by the selected entry (operation 406). This is important, because this can ensure that those media controllers can be included in the current persistence checkpoint. While waiting for the blocked entries to be cleared from the outstanding-request tracker, the host can also block the application interface, thus preventing the upper-level applications from issuing new memory requests to avoid the possibility of livelock.

Subsequent to issuing a PF request to the media controller identified by the selected entry in the PF cache, the host can allocate an entry corresponding to the PF request in the outstanding-request tracker and increment a counter associated with the persistence checkpoint (operation 408). The host can then remove the selected entry from the PF cache (operation 410). Note that it is possible to have multiple checkpoints in progress, and each checkpoint can have its own counter. The counter can be used to track whether all PFs triggered by a particular checkpoint or PF request receive a response (e.g., an ACK (acknowledgment) or NAK (negative acknowledgment)). The media controller responds to a PF with an ACK if the media controller determines that all previously received write requests have been persistently stored.

The fabric interface can determine if it receives a response (e.g., an ACK) for a PF associated with a checkpoint (operation 412). If so, the host can remove the corresponding PF entry from the outstanding-request tracker and decrement the counter for that checkpoint by one (operation 414). Once an entry is freed from the PF cache, the space can immediately be used by any blocked-state entry in the outstanding-request tracker. More specifically, the blocked-state entries in the outstanding-request tracker will have priority to enter the PF cache over other entries in the outstanding-request tracker.

If not, the fabric interface can determine if the PM cache is empty (i.e., the last entry in the PF cache has been issued a PF) (operation 416). Note that subsequent to the establishment of the checkpoint, new entries may be entered into the PF cache; these new entries can be included when issue PFs but are not required. The last entry in the PF cache may refer to the last entry of the current PF cache or the last entry of the PF cache at the time instant the checkpoint is established. If the PF cache is not empty, the fabric interface selects another entry in the PF cache to issue a PF (operation 406). In some embodiments, to ensure that all entries in the PF cache are issued PF requests at the time of the persistence checkpoint, the fabric interface walks through each occupied entry in the PF cache in sequence, issuing a PF request to each media controller. Once each entry is visited (and counted by the counter), the fabric interface can wait for acknowledgements for these PF requests (counter returns to zero) and then acknowledge the persistence checkpoint. If the PF cache is empty, the host can determine if the outstanding-request tracker contains any blocked entry (operation 418). If the outstanding-request tracker contains one or more blocked entries, the host can wait for the "stop" condition to be met by repeating operations 416 and 418. Note that the combination of an empty PF cache and the outstanding-request containing no blocked entry can result in a "stop" condition.

Once the "stop" condition is met, the system determines if the counter associated with this particular checkpoint is zero (operation 420). A zero counter means that the host has received responses to all PFs issued in response to the checkpoint. If the counter reaches zero, the host can send a response to the persistence checkpoint (operation 422). More specifically, the host can send the response to the upper-level application establishing the checkpoint. In the event of a persistence error (e.g., the host receives a NAK for a PF from a media controller), the host will send a NAK to the upper-level application, indicating a failed persistence checkpoint. Note that PFs from multiple checkpoints may be outstanding concurrently (e.g., they can coexist in the outstanding-request tracker) and complete in any order. However, the response to the PF requests establishing the checkpoints will be sent back to the upper-level applications in order with respect to the order of the PF requests received from the upper-level applications. In some embodiments, the PF requests for the multiple checkpoints can be stored in a first-in, first-out (FIFO) buffer. A PF request at the head of the FIFO can be removed when its counter reaches zero. To distinguish PF requests among the multiple concurrent persistence checkpoints, the system can include an identifier in the outstanding-request tracker entry holding the PF request, such that the correct counter can be identified and decremented when a response to a PF request is received.

In some embodiments, the logic for operating the tracking structure for tracking the media controllers that are owed PFs (e.g., the PF cache) and the tracking structure for tracking the outstanding write requests (e.g., the outstanding-request tracker) can be implemented using hardware (e.g., as a hardware processing circuit within the memory controller of the host). Alternatively, such logic can be implemented as machine-readable instructions executable by the hardware processing circuit of the memory controller. Implementing the tracking logic as well as the tracking structures using hardware modules can provide higher efficiency and faster speed for processing PF requests.

Figure 5:
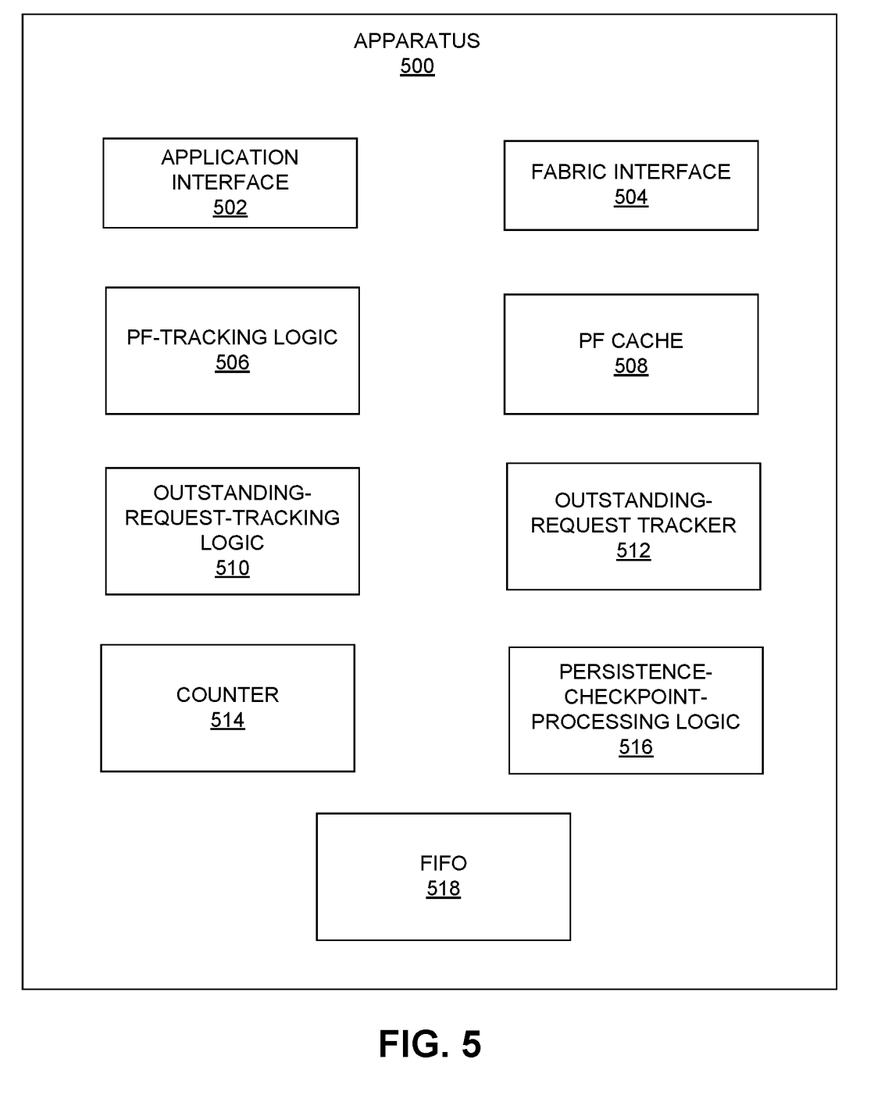
FIG. 5 illustrates an exemplary apparatus that facilitates operations of processing persistence checkpoints, according to one embodiment.

FIG. 5 illustrates an exemplary apparatus that facilitates operations of processing persistence checkpoints, according to one embodiment. Apparatus 500 can comprise a plurality of units or apparatuses, which may communicate with one another via a wired, wireless, quantum light, or electrical communication channel. Apparatus 500 may be realized using one or more integrated circuits, and may include fewer or more units or apparatuses than those shown in FIG. 5. Further, apparatus 500 may be integrated in a computer system, or realized as a separate device(s) which is/are capable of communicating with other computer systems and/or devices.

Apparatus 500 can include an application interface 502 for receiving, from upper-level applications, persistence checkpoints, which can be used to facilitate future data recovery.

Apparatus 500 can include a fabric interface 504 for sending requests (e.g., write, read, PF, etc.) and receiving responses (e.g., ACKs, NAKs, etc.) to and from media controllers.

Apparatus 500 can include a PF-tracking logic 506 for tracking media controllers that are owed PFs. A media controller is considered to be owed a PF if the media controller has sent ACKs to the write requests but has not yet received a PF. PF-tracking logic 506 can access a memory structure (e.g., a PF cache) 508, which can store entries identifying those media controllers that are owed PFs. PF cache 508 can be implemented using a CAM or RAM. Entries in PF cache 508 can be indexed using identifiers of the media controllers. PF-tracking logic 506 allocates an entry for a media controller in the event the media controller sends, over media-controller interface 504, an acknowledgment of a write request, if PF cache 508 does not have an entry for the media controller.

Apparatus 500 can include an outstanding-request-tracking logic 510 for tracking outstanding write requests sent over media-controller interface 504. A write request is considered outstanding if a response to the write request is not yet received from the media controller receiving the write request. Outstanding-request-tracking logic 510 can access a memory structure (e.g., an outstanding-request tracker) 512, which can store entries corresponding to the write requests. Outstanding-request-tracking logic 510 allocates an entry for a write request in outstanding-request tracker 512 when the write request is issued, and evicts such an entry from outstanding-request tracker 512 when an acknowledgment to the write request is received. However, in the event that the media controller issuing the write acknowledgment does not have an entry in PF cache 508 and PF cache 508 is full, outstanding-request-tracking logic leaves the write request in outstanding-request tracker 512 and changes its status from "outstanding" to "blocked" to indicate that an entry for the media controller needs to be added to PF cache 508 once space is freed in PF cache 508.

Apparatus 500 can also include a counter 514. Counter 514 can be incremented each time a PF is issued and decremented each time a PF is acknowledged. This way, the system can track, for each persistence checkpoint, whether all PFs issued for the checkpoint have been acknowledged. In situations where multiple checkpoints are being processed, apparatus 500 can maintain multiple counters, each counter corresponding to a particular checkpoint.

Apparatus 500 can also include persistence-checkpoint (PC)-processing logic 516 for processing persistence checkpoints received over application interface 502. PC-processing logic 516 can store the received persistence checkpoints in a FIFO buffer 518. PC-processing logic 516 can process each persistence checkpoint by issuing PF requests to media controllers identified by entries in PF cache 508. PC-processing logic 516 can assign a unique identifier to each persistence checkpoint. Such an identifier can be inserted in the outstanding-request tracker entries holding the PF requests triggered by the persistence checkpoint in order to distinguish PF requests among multiple concurrent persistence checkpoints. Such an identifier also allows the system to identify and decrement a correct counter when a response to a PF request is received. Note that PF requests to the media controllers can be issued over media-controller interface 504 out of order. However, responses to PCs are sent over application interface 502 in the order those PCs are received. More specifically, PC-processing logic 516 can remove the head of FIFO 518 when acknowledgments for all PFs issued for that FIFO entry have been received over media-controller interface 504. PC-processing logic 516 can further send a response for the PC over application interface 502. If any of the PF responses received over media-controller interface 504 is a NAK, PC-processing logic 516 sends a NAK over application interface 502. Otherwise, PC-processing logic 516 sends an ACK over application interface 502.

Figure 6:
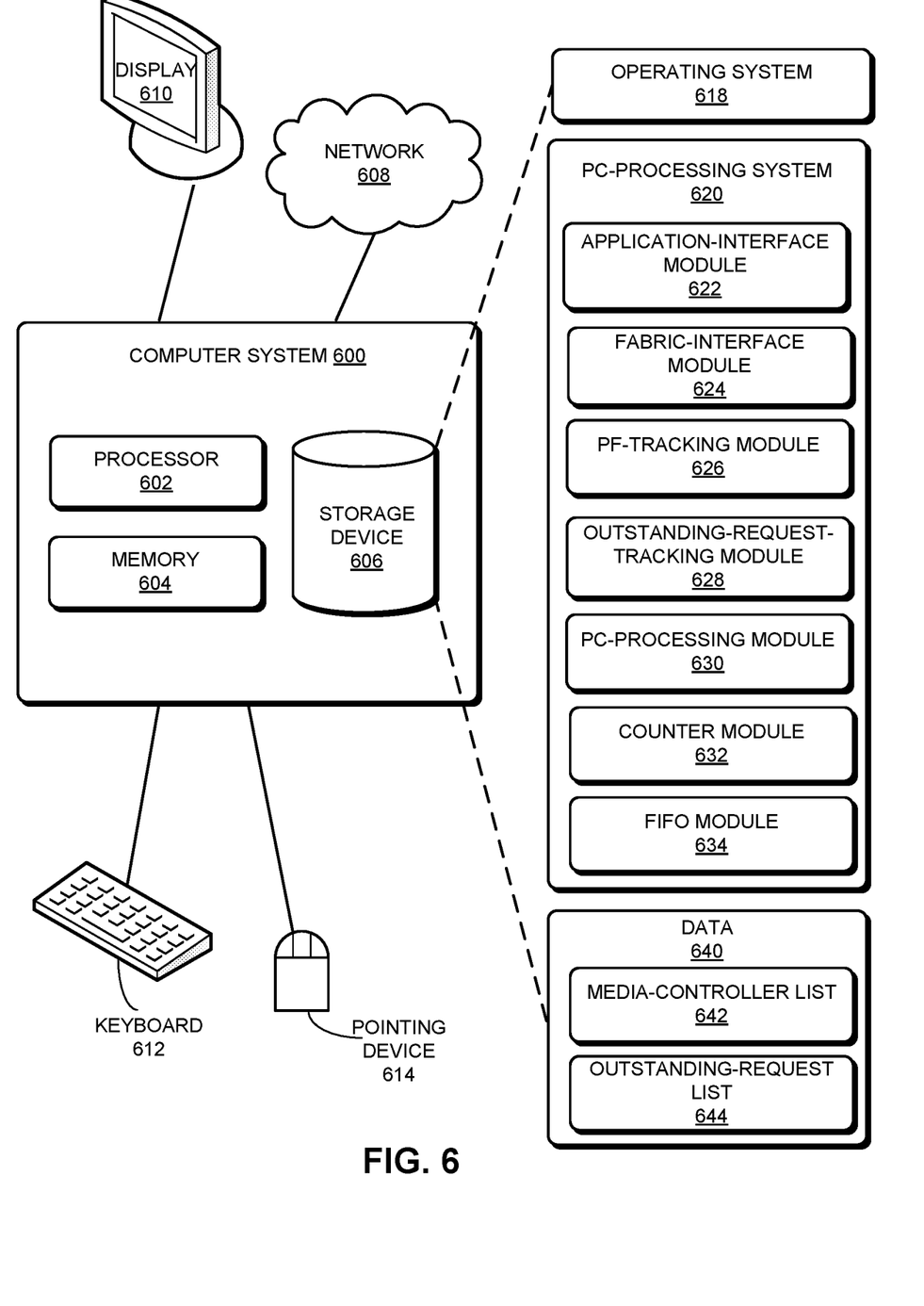
FIG. 6 illustrates an exemplary computer system that facilitates the processing of persistence checkpoints, according to one embodiment.

FIG. 6 illustrates an exemplary computer system that facilitates the processing of persistence checkpoints, according to one embodiment. Computer system 600 includes a processor 602, a memory 604, and a storage device 606. Computer system 600 can be coupled to a display device 610, a keyboard 612, and a pointing device 614, and can also be coupled via one or more network interfaces to network 608. Storage device 606 can store an operating system 618, a PC-processing system 620, and data 640.

PC-processing system 620 can include instructions, which when executed by computer system 600 can cause computer system 600 to perform methods and/or processes described in this disclosure. PC-processing system 620 can include instructions for interfacing with upper-level applications (application-interface module 622), instructions for interfacing with the fabric (fabric-interface module 624), instructions for tracking media controllers that are owed PFs (PF-tracking module 626), instructions for tracking outstanding write requests (outstanding-request-tracking module 628), instructions for processing persistence checkpoints (PC-processing module 630), instructions for maintaining a counter for each pending PC (counter module 632), and instructions for maintaining a FIFO storing the pending PCs (FIFO module 634). Data 640 can include a list of media controllers that are owed PFs (media-controller list 642) and a list of outstanding write requests (outstanding-request list 644).

In general, the system provides a cache-based solution to the problem of tracking which media controllers are owed persistent flushes at a persistence checkpoint. The system implements a PF cache to track media controllers that have acknowledged write requests but not yet received PFs. The system also implements a FIFO to allow multiple concurrent checkpoints to coexist and counters to accumulate PF responses for each concurrent checkpoint. The system also provides a mechanism to deal with the situation of the PF cache being full. More specifically, by marking a write request that cannot enter the PF cache as being "blocked" in a cache tracking the write request (e.g., the outstanding-request tracker), the system prevents new write requests from being issued before all blocked entries in the outstanding-request tracker can be evicted. Moreover, by reserving at least one space in the outstanding-request tracker for PFs, the system can prevent the occurrence of a deadlock where PF-cache evictions are blocked by an outstanding-request tracker full of blocked write requests. The system additionally provides a mechanism for performing autonomous PFs, which can reduce the flush volume and duration associated with future checkpoints and the required tracking resources.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. An apparatus, comprising:
a persistent flush (PF) cache;
a PF-tracking logic coupled to the PF cache, wherein the PF-tracking logic is to: in response to receiving, from a media controller, an acknowledgment to a write request, determine whether the PF cache includes an entry corresponding to the media controller;
in response to the PF cache not including the entry corresponding to the media controller, allocate an entry in the PF cache for the media controller;
in response to receiving a persistence checkpoint, identify a media controller from a plurality of media controllers based on entries stored in the PF cache;
issue a persistent flush request to the identified media controller to persist write requests received by the identified media controller; and
remove an entry corresponding to the identified media controller from the PF cache subsequent to issuing the persistent flush request; and
an outstanding-request tracker and an outstanding-request-tracking logic, wherein the outstanding-request-tracking logic is to:
remove an entry corresponding to the acknowledged write request from the outstanding-request tracker, in response to the PF-tracking logic finding a matching entry or allocating the entry in the PF cache for the media controller sending the acknowledgment;
keep the entry corresponding to the acknowledged write request in the outstanding-request tracker, in response to the PF cache being full; and
modify a state of the acknowledged write request as being blocked.

2. The apparatus of claim 1, wherein the PF-tracking logic is to:
in response to determining that the outstanding-request tracker comprises a blocked write request, wait for the blocked write request to be cleared from the outstanding-request tracker before issuing new write requests.

3. The apparatus of claim 1, wherein the outstanding-request tracker comprises at least one entry reserved for persistent flush requests.

4. The apparatus of claim 1, further comprising a persistence-checkpoint (PC)-processing logic, a first-in, first-out (FIFO) buffer, and one or more counters;
wherein the PC-processing logic is to place received persistence checkpoints (PCs) in the FIFO and associate each entry in the FIFO with a counter.

5. The apparatus of claim 4, wherein the PC-processing logic is to:
increment the counter associated with an entry in the FIFO in response to issuing a persistent flush request triggered by the entry in the FIFO; and
decrement the counter associated with the entry in the FIFO in response to receiving a response to a persistent flush request triggered by the entry in the FIFO.

6. The apparatus of claim 5, wherein the PC-processing logic is to:
in response to determining that a counter associated with a head entry of the FIFO reaches zero, remove the head entry from the FIFO; and
send a response to a PF request corresponding to the head entry of the FIFO.

7. The apparatus of claim 1, wherein the PF-tracking logic is to issue an autonomous persistent flush request to a media controller corresponding to an entry in the PF cache, without receiving a persistence checkpoint.

8. The apparatus of claim 7, wherein the PF-tracking logic is to:
determine whether an occupancy rate of the PF cache exceeds a predetermined threshold;
in response to determining that the occupancy rate of the PF cache does not exceed the predetermined threshold, pause for a predetermined duration before determining whether to issue a subsequent autonomous persistent flush request; and
in response to determining that the occupancy rate of the PF cache exceeds the predetermined threshold, issue a subsequent autonomous persistent flush request without pausing.

9. A method, comprising:
maintaining a persistent flush (PF) cache;
in response to receiving, from a media controller, an acknowledgment to a write request, determining whether the PF cache includes an entry corresponding to the media controller;
in response to the PF cache not including the entry corresponding to the media controller, allocating an entry in the PF cache for the media controller;
in response to receiving a persistence checkpoint (PC), identifying a media controller from a plurality of media controllers based on entries stored in the PF cache;
issuing a persistent flush request to the identified media controller to persist write requests received by the identified media controller;
removing an entry corresponding to the identified media controller from the PF cache subsequent to issuing the persistent flush request;
issuing an autonomous persistent flush request to a media controller corresponding to an entry in the PF cache, without receiving a persistence checkpoint;

determining whether an occupancy rate of the PF cache exceeds a predetermined threshold; and in response to determining that the occupancy rate of the PF cache does not exceed the predetermined threshold, pausing for a predetermined duration before determining whether to issue a subsequent autonomous persistent flush request; and in response to determining that the occupancy rate of the PF cache exceeds the predetermined threshold, issuing a subsequent autonomous persistent flush request without pausing.

10. The method of claim 9, further comprising:

maintaining an outstanding-request tracker storing outstanding write requests; and removing an entry corresponding to the acknowledged write request from the outstanding-request tracker, in response to finding a matching entry or allocating the entry in the PF cache for the media controller sending the acknowledgment.

11. The method of claim 10, further comprising:

keeping the entry corresponding to the acknowledged write request in the outstanding-request tracker, in response to the PF cache being full; and modifying a state of the acknowledged write request as being blocked in the outstanding-request tracker.

12. The method of claim 11, further comprising:

in response to determining that the outstanding-request tracker comprises a blocked write request, waiting for the blocked write request to be cleared from the write-request tracker before issuing new write requests.

13. The method of claim 10, further comprising reserving at least one entry in the outstanding-request tracker for persistent flush requests.

14. The method of claim 9, further comprising;

maintaining a first-in, first-out (FIFO) buffer for storing one or more persistence checkpoints (PCs); and maintaining one or more counters, wherein each entry in the FIFO is associated with a counter.

15. The method of claim 14, further comprising:

incrementing the counter associated with an entry in the FIFO, in response to issuing a persistent flush request triggered by the entry in the FIFO; and decrementing the counter associated with the entry in the FIFO, in response to receiving a response to a persistent flush request triggered by the entry in the FIFO.

16. The method of claim 15, further comprising:

in response to determining that a counter associated with a head entry of the FIFO reaches zero, removing the head entry from the FIFO; and sending a response to a persistence checkpoint (PC) corresponding to the head entry of the FIFO.

* * * * *